US012798354B2

(12) United States Patent
Tomita et al.

(10) Patent No.: US 12,798,354 B2
(45) Date of Patent: Nov. 17, 2026

(54) PLUG-IN HYBRID ELECTRIC VEHICLE

(71) Applicant: TOYOTA JIDOSHA KABUSHIKI KAISHA, Toyota (JP)

(72) Inventors: Makoto Tomita, Nagoya (JP); Takahiro Kawashima, Chiryu (JP); Taku Harada, Nisshin (JP); Chikashi Ohta, Toyota (JP); Shoichi Sasaki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 18/965,452

(22) Filed: Dec. 2, 2024

(65) Prior Publication Data

US 2025/0222756 A1 Jul. 10, 2025

(30) Foreign Application Priority Data

Jan. 4, 2024 (JP) ................................ 2024-000340

(51) Int. Cl.

| | |
|---|---|
| ***B60K 6/40*** | (2007.10) |
| ***B60J 5/06*** | (2006.01) |
| ***B60K 6/28*** | (2007.10) |
| ***B60K 13/04*** | (2006.01) |
| ***B60K 15/04*** | (2006.01) |
| ***B60K 15/063*** | (2006.01) |

(Continued)

(52) U.S. Cl.

CPC .................. *B60K 6/40* (2013.01); *B60J 5/06* (2013.01); *B60K 6/28* (2013.01); *B60K 13/04* (2013.01); *B60K 15/04* (2013.01); *B60K 15/063* (2013.01); *B60N 2/01* (2013.01); *B60N 2/06* (2013.01); *B60Y 2200/92* (2013.01); *B60Y 2400/112* (2013.01); *B60Y 2400/20* (2013.01); *B60Y 2400/61* (2013.01)

(58) Field of Classification Search

CPC . B60K 13/04; B60K 6/40; B60K 6/28; B60K 6/20; B60K 6/24; B60K 6/26; B60K 15/04; B60K 1/02; B60K 1/00; B60J 5/06; B60N 2/01; B60N 2/06; B60N 2/005; B60Y 2200/92; B60Y 2400/112; B60Y 2400/20; B60Y 2400/61; B60L 50/66

See application file for complete search history.

(56) References Cited

U.S. PATENT DOCUMENTS

| | | | |
|---|---|---|---|
| 11,142,270 | B1 | 10/2021 | Perez et al. |
| 2013/0235526 | A1 | 9/2013 | Watanabe |

(Continued)

FOREIGN PATENT DOCUMENTS

| | | | |
|---|---|---|---|
| CN | 109278873 | A | 1/2019 |
| JP | 2013-184497 | A | 9/2013 |

(Continued)

*Primary Examiner* — Lori Wu

(74) *Attorney, Agent, or Firm* — Oliff PLC

(57) ABSTRACT

A minivan-type plug-in hybrid electric vehicle includes a battery, a fuel tank, and an exhaust pipe, which are disposed under a floor panel. The battery is disposed so as to extend over both the right area and the left area of the vehicle. The center of gravity of the battery is offset toward a first side in the vehicle width direction from the center in the vehicle width direction. The exhaust pipe is disposed on a second side of the battery, opposite to the first side, in the vehicle width direction. The exhaust pipe is disposed to a side of the battery.

7 Claims, 4 Drawing Sheets

(51) Int. Cl.
*B60N 2/01* (2006.01)
*B60N 2/06* (2006.01)

(56) References Cited

U.S. PATENT DOCUMENTS

| | | | | |
|---|---|---|---|---|
| 2014/0232184 | A1* | 8/2014 | Ukai | B60K 1/00 307/10.1 |
| 2017/0106743 | A1* | 4/2017 | Ajisaka | B62D 25/20 |
| 2017/0232866 | A1 | 8/2017 | Sugizaki et al. | |
| 2018/0056752 | A1 | 3/2018 | Ogawa et al. | |
| 2018/0072352 | A1 | 3/2018 | Shimoda | |
| 2020/0079205 | A1 | 3/2020 | Ohkuma et al. | |
| 2021/0339617 | A1 | 11/2021 | Ohkuma et al. | |

FOREIGN PATENT DOCUMENTS

| | | | |
|---|---|---|---|
| JP | 2017-140990 | A | 8/2017 |
| JP | 2018-030448 | A | 3/2018 |
| JP | 2018-039452 | A | 3/2018 |
| JP | 2021-104759 | A | 7/2021 |
| JP | 2021-160519 | A | 10/2021 |
| WO | 2020/044792 | A1 | 3/2020 |

* cited by examiner

PLUG-IN HYBRID ELECTRIC VEHICLE

CROSS-REFERENCE TO RELATED APPLICATIONS

This application is based upon and claims the benefit of priority from Japanese Patent Application No. 2024-000340, filed on Jan. 4, 2024, the entire contents of which are incorporated herein by reference.

BACKGROUND

1. Field

The present disclosure relates to a plug-in hybrid electric vehicle that can be connected to an external electrical power supply to charge its battery.

2. Description of Related Art

Japanese Laid-Open Patent Publication No. 2021-160519 discloses a structure for a hybrid electric vehicle, which includes an engine and a drive motor as its drive sources. In this vehicle, the battery, high-voltage components, and exhaust system components are compactly arranged beneath the floor panel.

A minivan-type vehicle is equipped with a sliding seat as the second-row seat and a sliding door. The sliding seat is capable of sliding along the floor in the front-rear direction. To ensure a sufficient sliding range for the sliding seat, long sliding rails must be installed on the floor. Therefore, in a minivan-type vehicle, it is desirable for the floor behind the first-row seats to have a low, flat structure.

A plug-in hybrid electric vehicle, which can charge its battery by connecting to an external electrical power supply, requires a larger battery than a hybrid electric vehicle.

In other words, in a minivan-type plug-in hybrid electric vehicle, it is desirable to install a large battery and a low, flat floor to ensure a spacious passenger compartment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a minivan-type plug-in hybrid electric vehicle in which a passenger compartment and a cargo space are not separated by a partition includes an engine compartment provided in front of the passenger compartment in a vehicle front-rear direction, power sources including an engine and a motor, a fuel tank configured to store fuel to be supplied to the engine, a battery configured to store electric power to be supplied to the motor, a vehicle on-board charger configured to convert AC power supplied from outside of the plug-in hybrid electric vehicle into DC power and charge the battery with the DC power, a power transmission mechanism configured to transmit rotational power of the engine and the motor to front wheels, an inverter configured to drive the motor, an exhaust pipe configured to guide exhaust gas from the engine rearward in the vehicle front-rear direction, a muffler configured to reduce exhaust noise, a first-row seat arranged on a floor panel that forms a floor surface of the passenger compartment, and a second-row seat disposed on the floor panel so as to be positioned rearward of the first-row seat in the vehicle front-rear direction. The engine, the motor, the power transmission mechanism, and the inverter are disposed in the engine compartment. In the vehicle front-rear direction, the first-row seat is positioned rearward of the front wheels, and the second-row seat is positioned forward of the rear wheels. The second-row seat is configured to be slidable on the floor panel in the vehicle front-rear direction. The battery, the fuel tank, the exhaust pipe, and the muffler are disposed under the floor panel. The plug-in hybrid electric vehicle includes a right area and a left area with a center in a vehicle width direction serving as a boundary. The battery is disposed so as to extend over both the right area and the left area such that a center of gravity of the battery is offset toward a first side in the vehicle width direction from the center in the vehicle width direction. The exhaust pipe is disposed on a second side of the battery in the vehicle width direction, the second side being opposite to the first side.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A plug-in hybrid electric vehicle 1 according to one embodiment will now be described with reference to FIGS. 1 to 7. In the following description, terms related to orientations or directions, such as "front", "rear", "upper", "lower", "right", and "left", are defined based on the plug-in hybrid electric vehicle 1.

External Structure of the Plug-In Hybrid Electric Vehicle 1

Figure 1:
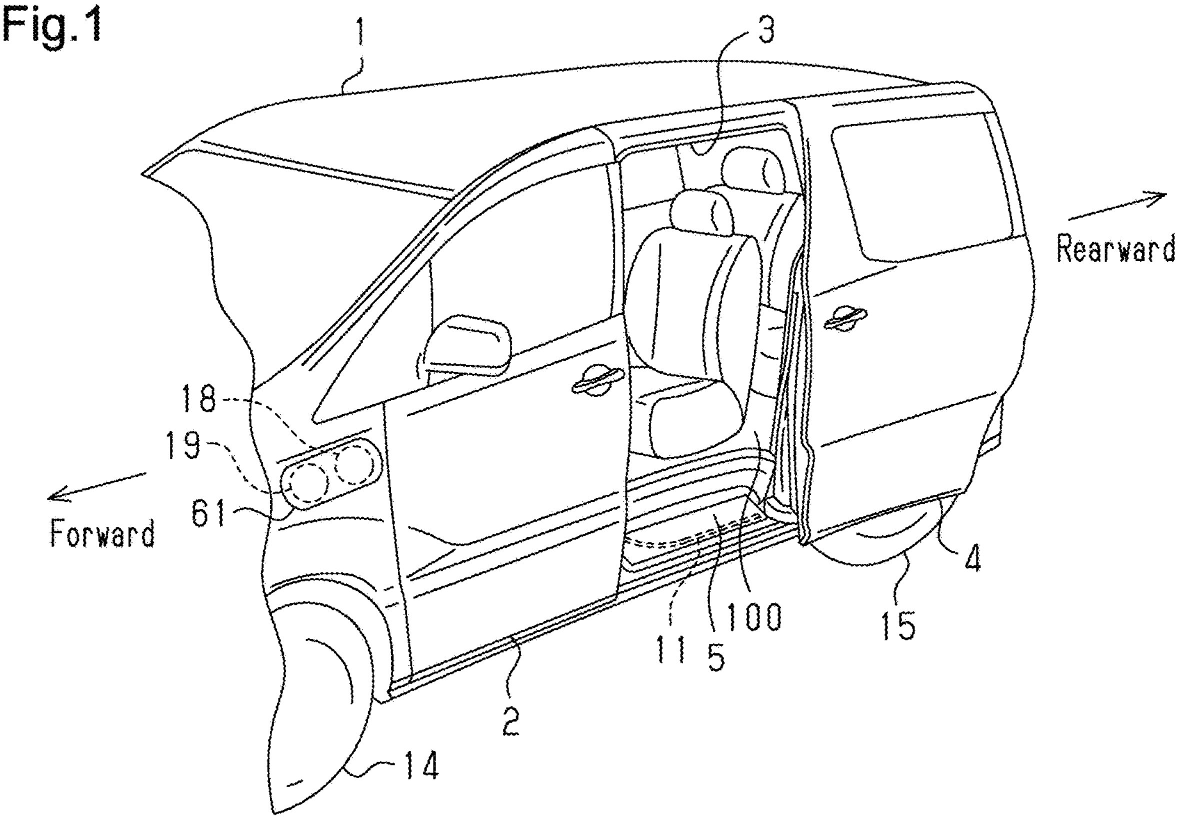
FIG. 1 is a schematic diagram of a minivan-type plug-in hybrid electric vehicle according to an embodiment.

FIG. 1 is a schematic diagram of the plug-in hybrid electric vehicle 1 according to the present embodiment. The plug-in hybrid electric vehicle 1 has a left side surface, which is one of a first side surface and a second side surface, and a right side surface, which is the other of the first side surface and the second side surface. As shown in FIG. 1, the plug-in hybrid electric vehicle 1 includes a front door 2, an opening 3, and a sliding door 4, which are on the left side surface. A charging lid 61 is disposed on the left side surface of the plug-in hybrid electric vehicle 1 and forward of the front door 2. A first charging port 18 and a second charging port 19, which will be discussed below, are disposed inside the charging lid 61.

The opening 3 is opened and closed by the sliding door 4, which moves in the vehicle front-rear direction. A step panel 5 is disposed in a lower portion of the opening 3. The step panel 5 is disposed below a floor panel 100, which forms a floor surface of the plug-in hybrid electric vehicle 1. A guide rail 11 extending in the vehicle front-rear direction is fixed to a lower surface of the step panel 5. A front end of the guide rail 11 is positioned rearward of a front wheel 14. A rear end of the guide rail 11 is positioned forward of a rear wheel 15.

Figure 2:
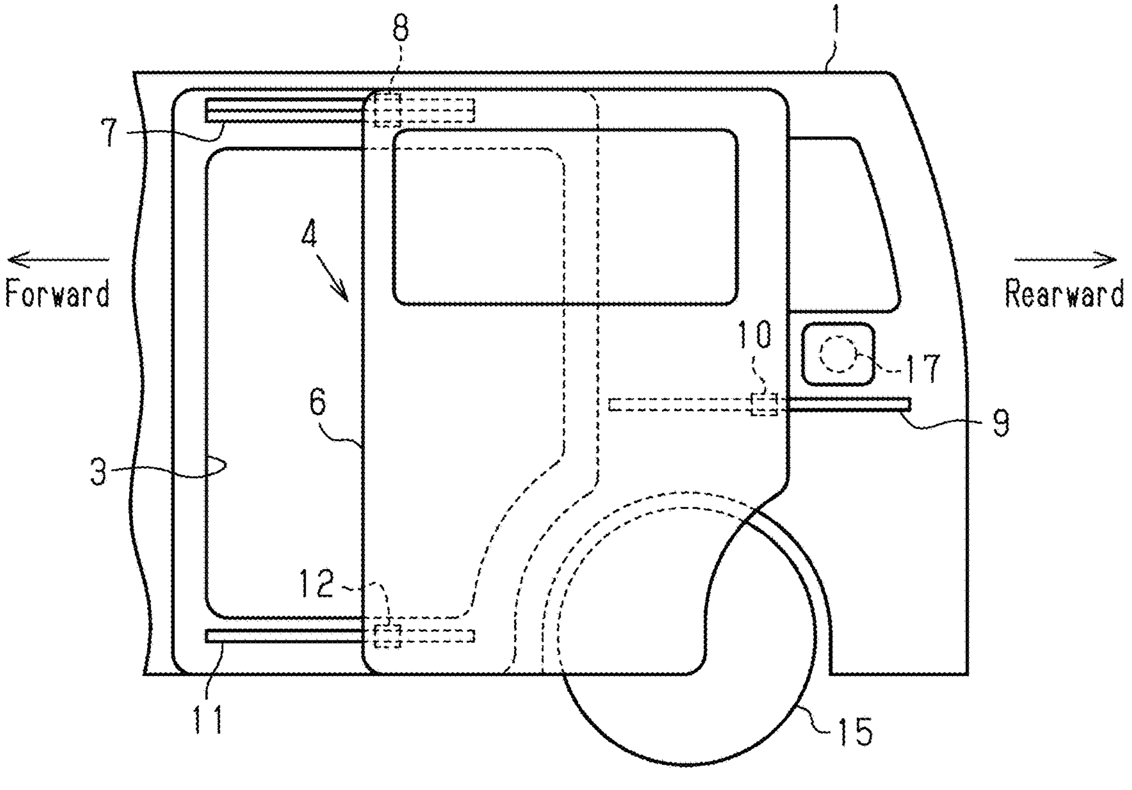
FIG. 2 is a side view of a sliding door provided in the plug-in hybrid electric vehicle of FIG. 1 as viewed from the left side.

As shown in FIG. 2, the fuel inlet 17 is disposed on the left side surface of the plug-in hybrid electric vehicle 1 and rearward of the sliding door 4. An upper rail 7, a center rail 9, and a guide rail 11 are disposed around the opening 3. The upper rail 7 is disposed above the opening 3. The guide rail 11 is disposed below the opening 3. The center rail 9 is disposed rearward of the opening 3 on the side surface of the vehicle 1. The position of the center rail 9 in the vehicle height direction is below the upper rail 7 and above the guide rail 11.

The sliding door 4 includes a sliding door body 6, an upper hinge unit 8, a center hinge unit 10, and a guide hinge unit 12. The upper hinge unit 8 and the guide hinge unit 12 are fixed to parts of the sliding door body 6 near the front end in a vehicle length direction. The center hinge unit 10 is fixed to a part of the sliding door body 6 near the rear end in the vehicle length direction. The vehicle length direction coincides with the vehicle front-rear direction.

The upper hinge unit 8 is fixed to an upper end portion of the sliding door body 6. The guide hinge unit 12 is fixed to a lower end portion of the sliding door body 6. The center hinge unit 10 is fixed to a central portion of the sliding door body 6 in the vertical direction.

The upper hinge unit 8 is movably supported by the upper rail 7. The center hinge unit 10 is movably supported by the center rail 9. The guide hinge unit 12 is movably supported by the guide rail 11. Thus, the upper hinge unit 8, the center hinge unit 10, and the guide hinge unit 12 connect the sliding door body 6 to the side surface of the vehicle 1. The upper hinge unit 8 moves along the upper rail 7. The center hinge unit 10 moves along the center rail 9. The guide hinge unit 12 moves along the guide rail 11. The sliding door body 6 thus moves relative to the vehicle side surface. The upper rail 7, the center rail 9, and the guide rail 11 define the moving direction of the sliding door 4.

Although not illustrated, the plug-in hybrid electric vehicle 1 includes a front door 2, an opening 3, a sliding door 4, and a mechanism for supporting the sliding door 4 on the right side surface.

Internal Structure of the Plug-In Hybrid Electric Vehicle 1

Figure 3:
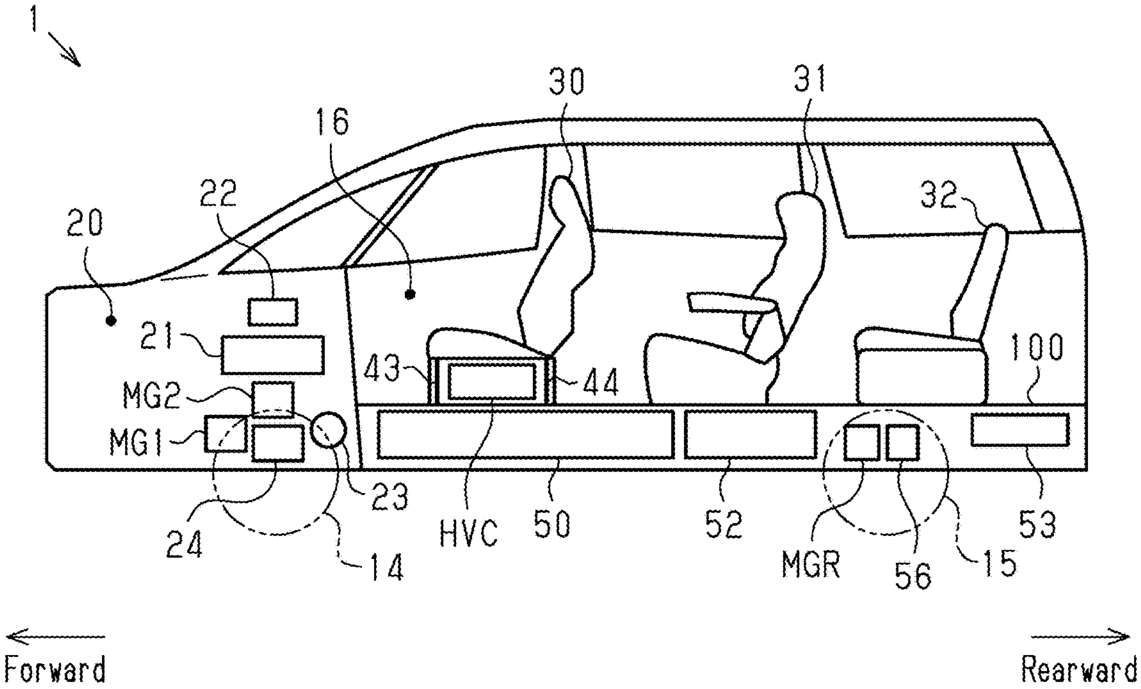
FIG. 3 is a schematic diagram of an internal structure of the plug-in hybrid electric vehicle shown in FIG. 1.

FIG. 3 is a side view schematically showing an internal structure of the plug-in hybrid electric vehicle 1. As shown in FIG. 3, the plug-in hybrid electric vehicle 1 is a minivan-type vehicle in which a passenger compartment 16 and a cargo space are not separated by a partition. The plug-in hybrid electric vehicle 1 includes an engine compartment 20 forward of the passenger compartment 16. The engine compartment 20 accommodates an engine 21, a first motor-generator MG1, a second motor-generator MG2, a power control unit 22, a power split mechanism 23, and a speed reduction mechanism 24. The engine 21, the first motor-generator MG1, and the second motor-generator MG2 are power sources.

First-row seats 30, second-row seats 31, and third-row seats 32 are disposed on the floor panel 100. The second-row seats 31 are positioned rearward of the first-row seats 30. In the vehicle side view, the first-row seats 30 are positioned rearward of the front wheel 14. In the vehicle side view, the second-row seats 31 are positioned forward of the rear wheel 15.

Figure 4:
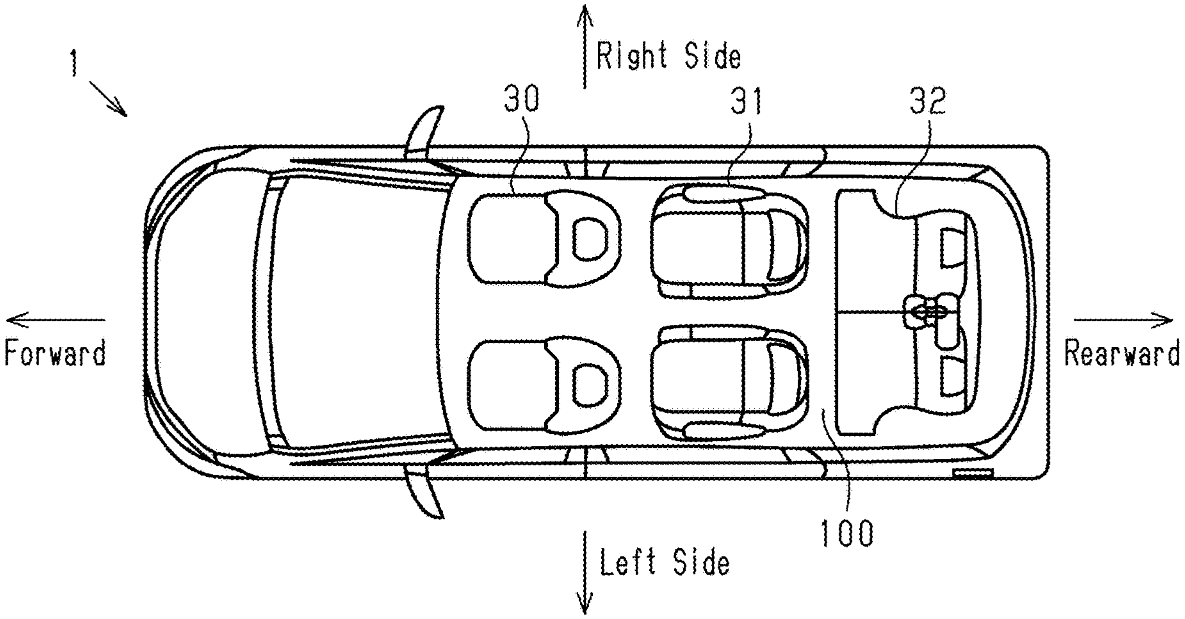
FIG. 4 is a schematic diagram of an arrangement of seats in the plug-in hybrid electric vehicle shown in FIG. 1.

FIG. 4 is a plan view schematically showing the arrangement of the seats. As shown in FIG. 4, the first-row seats 30 include a driver's seat and a front passenger seat. The second-row seats 31 include two independent seats. The third-row seats 32 are positioned rearward of the second-row seats 31.

As shown in FIG. 3, one or more high-voltage components HVC are disposed below the first-row seats 30 and above the floor panel 100. Details of the high-voltage components HVC will be described later.

The plug-in hybrid electric vehicle 1 includes a first cross member 43 and a second cross member 44 below the first-row seats 30 and above the floor panel 100. The first cross member 43 and the second cross member 44 are frame members extending in the vehicle width direction. The first cross member 43 is disposed forward of the high-voltage components HVC. The second cross member 44 is disposed rearward of the high-voltage components HVC. That is, the first cross member 43 and the second cross member 44 are disposed so as to sandwich the high-voltage components HVC in the vehicle front-rear direction.

A battery 50, a fuel tank 52, a muffler 53, a rear-wheel drive motor-generator MGR, and a rear-wheel speed reduction mechanism 56 are disposed under the floor panel 100. The battery 50 is configured to store electric power to be supplied to the first motor-generator MG1, the second motor-generator MG2, and the rear-wheel drive motor-generator MGR. The fuel tank 52 is configured to store fuel to be supplied to the engine 21. The muffler 53 is configured to reduce exhaust noise.

The fuel tank 52 is disposed rearward of the battery 50. The rear-wheel drive motor-generator MGR is disposed rearward of the fuel tank 52. The muffler 53 is disposed rearward of the rear-wheel drive motor-generator MGR.

The high-voltage components HVC are disposed on the battery 50.

Devices Disposed on the Floor Panel 100

Figure 5:
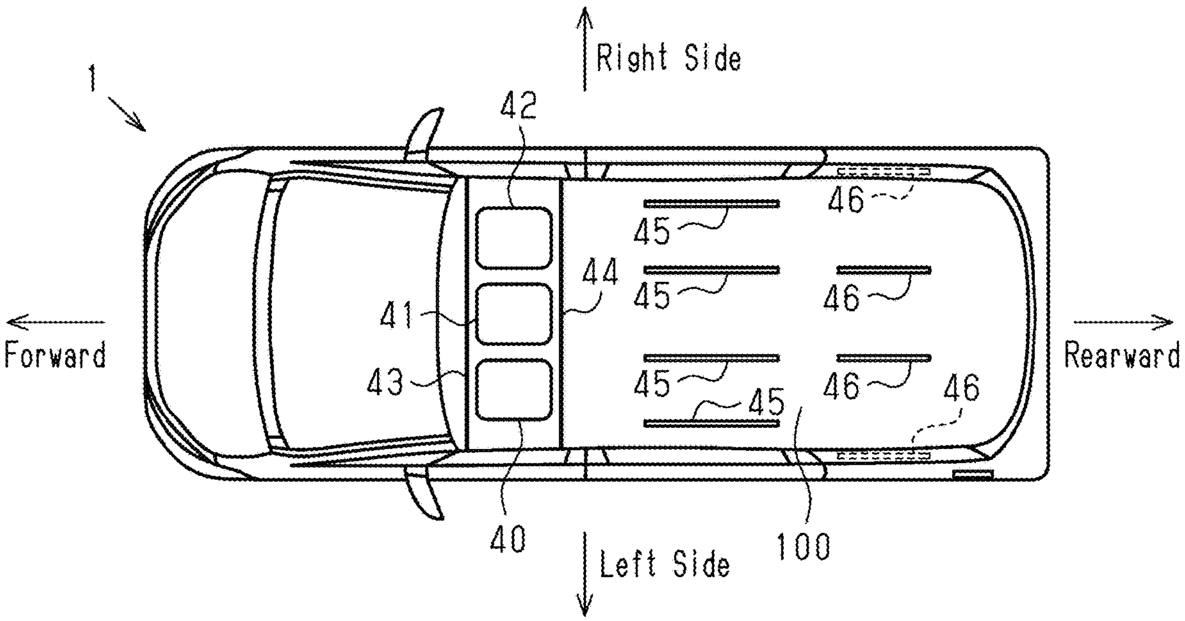
FIG. 5 is a schematic diagram of an arrangement of devices disposed on a floor panel in the plug-in hybrid electric vehicle shown in FIG. 1.

FIG. 5 is a plan view schematically showing the arrangement of devices disposed on the floor panel 100. As shown in FIG. 5, a vehicle on-board charger 40, a junction box 41, and a DC/DC converter 42 are disposed on the floor panel 100. The vehicle on-board charger 40, the junction box 41, and the DC/DC converter 42 are the high-voltage components HVC.

Four first slide rails 45 extending in the vehicle front-rear direction are disposed rearward of the high-voltage components HVC. Four second slide rails 46 extending in the vehicle front-rear direction are disposed rearward of the first slide rails 45. The first slide rails 45 are all disposed on the floor panel 100. Two of the four second slide rails 46 at the center in the vehicle width direction are disposed on the floor panel 100. The remaining two second slide rails 46 are disposed on the side surfaces of the vehicle 1 in the passenger compartment 16.

As shown in FIG. 4, the second-row seats 31 are disposed on the first slide rails 45. The second-row seats 31 are configured to be slidable in the vehicle front-rear direction along the first slide rails 45. The third-row seats 32 are disposed on the second slide rails 46. The third-row seats 32 are configured to be slidable in the vehicle front-rear direction along the second slide rails 46.

Devices Disposed under the Floor Panel 100

Figure 6:
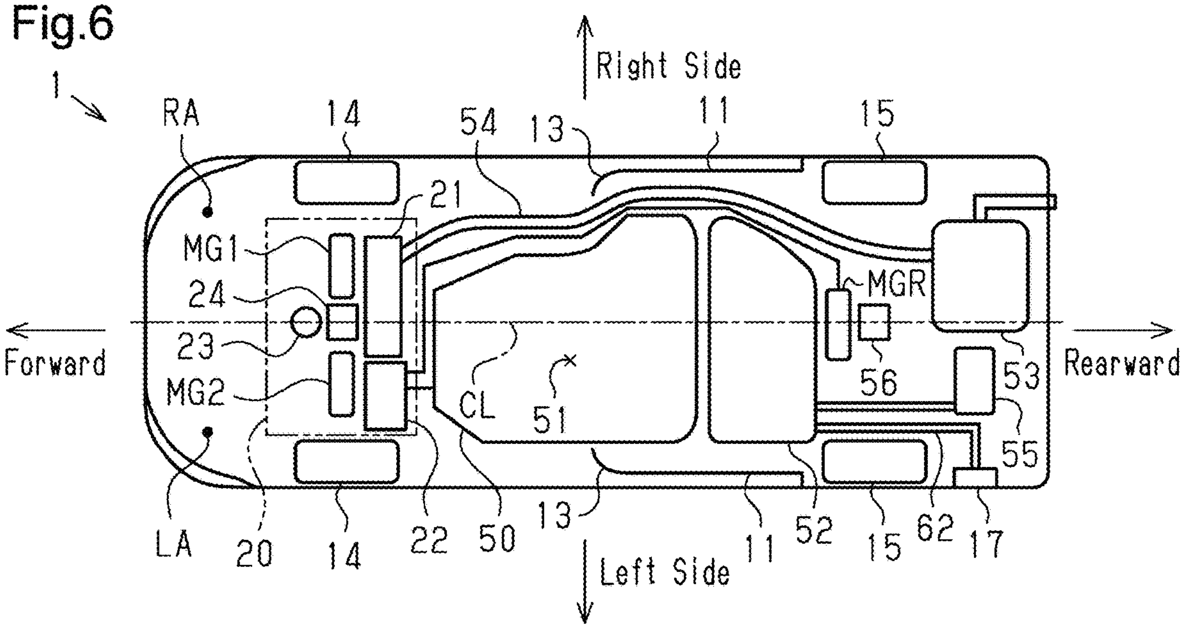
FIG. 6 is a schematic diagram of an arrangement of devices disposed under the floor panel in the plug-in hybrid electric vehicle shown in FIG. 1.

FIG. 6 is a plan view schematically showing the arrangement of devices disposed under the floor panel 100. The plug-in hybrid electric vehicle 1 is divided into a right area RA and a left area LA with a center line CL, indicating the center in the vehicle width direction, serving as a boundary.

The battery 50 is disposed so as to extend over both the right area RA and the left area LA. The battery 50 is disposed closer to the left side of the vehicle 1 than to the right side. A center of gravity 51 of the battery 50 is positioned in the left area LA. That is, the battery 50 is arranged offset toward a first side in the vehicle width direction so that the center of gravity 51 of the battery 50 is displaced toward the first side from the center line CL in the vehicle width direction.

The plug-in hybrid electric vehicle 1 includes the guide rails 11, which are located under the floor panel 100 and slidably support the sliding doors 4. The guide rails 11 are arranged so as to overlap with a part of the battery 50 in the vehicle front-rear direction. Each guide rail 11 includes a curved portion 13 that extends forward so as to curve inward in the vehicle width direction. When the sliding door 4 is closed, the sliding door 4 is pulled inward in the vehicle width direction along the curved portion 13 of the guide rail 11.

An exhaust pipe 54 configured to guide exhaust gas from the engine 21 rearward is disposed under the floor panel 100. The exhaust pipe 54 connects the engine 21 to the muffler 53. The exhaust pipe 54 is disposed closer to the right side of the vehicle 1 than to the left side. The exhaust pipe 54 is disposed in the right area RA. The exhaust pipe 54 is disposed on a second side of the battery 50, opposite to the first side, in the vehicle width direction. The exhaust pipe 54 is disposed between the battery 50 and the guide rail 11. The exhaust pipe 54 is bent outward in the vehicle width direction along the curved portion 13 of the corresponding guide rail 11.

The fuel tank 52 is disposed rearward of the battery 50. The fuel tank 52 is connected to the fuel inlet 17 via a fuel supply pipe 62.

A fuel vapor recovery device 55 is disposed rearward of the rear-wheel drive motor-generator MGR and to a side of the muffler 53 in the vehicle width direction. The fuel vapor recovery device 55 is a canister that adsorbs fuel vapor gas generated inside the fuel tank 52.

Drive System of the Plug-In Hybrid Electric Vehicle 1

Figure 7:
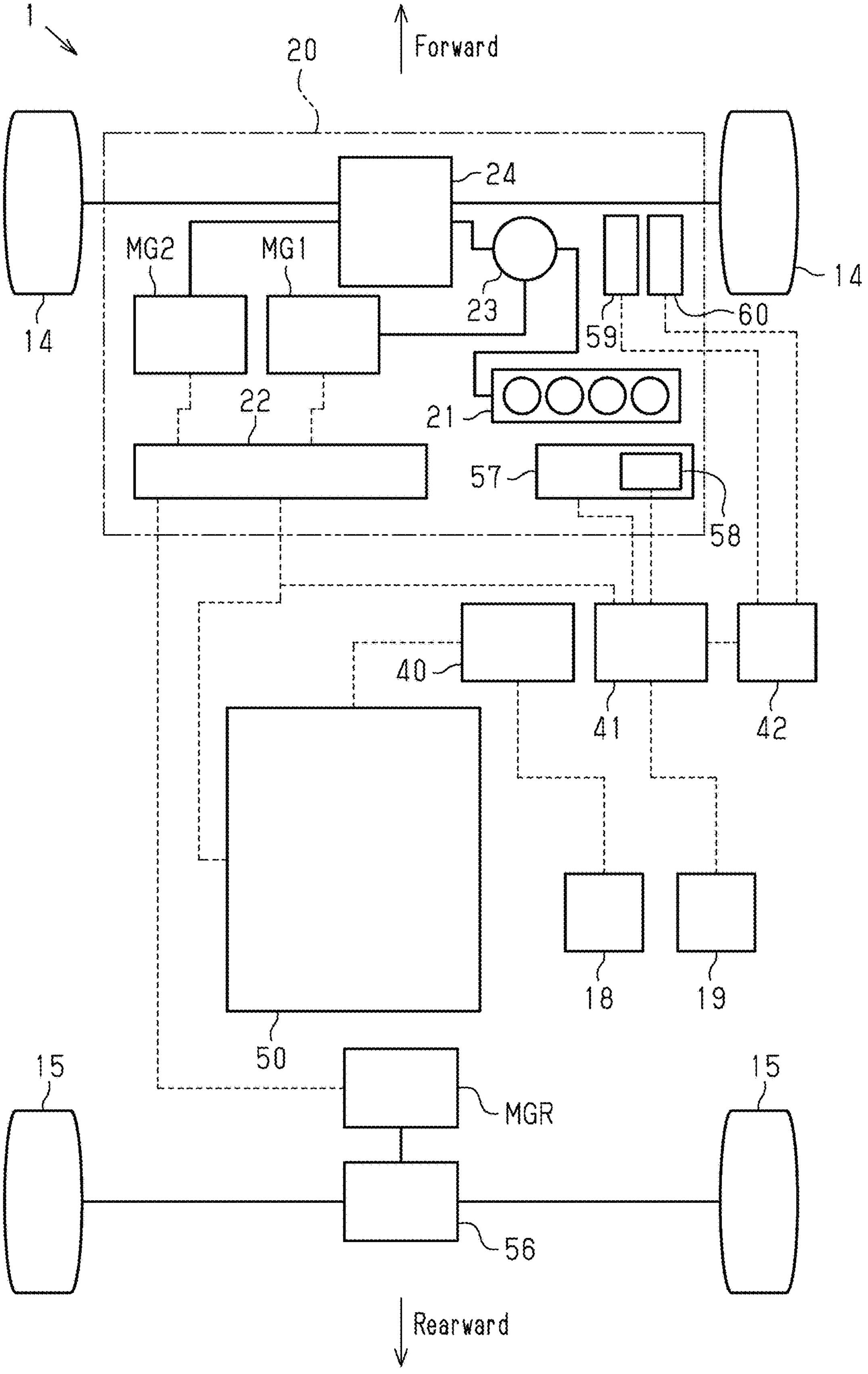
FIG. 7 is a schematic diagram of a configuration of a drive system and a configuration of an electric system in the plug-in hybrid electric vehicle shown in FIG. 1.

FIG. 7 schematically shows a configuration of a drive system and a configuration of an electric system in the plug-in hybrid electric vehicle 1 of the present embodiment.

As shown in FIG. 7, the second motor-generator MG2 is connected to the battery 50 via the power control unit 22. The second motor-generator MG2 is coupled to the front wheels 14 via the speed reduction mechanism 24. The rotational power of the second motor-generator MG2 is transmitted to the front wheels 14 via the speed reduction mechanism 24, which is a power transmission mechanism. In other words, the second motor-generator MG2 functions as a drive motor.

The engine 21 is connected to the front wheels 14 via the power split mechanism 23 and the speed reduction mechanism 24. Like the speed reduction mechanism 24, the power split mechanism 23 is also a power transmission mechanism. The rotational power of the engine 21 is transmitted to the front wheels 14 via the power transmission mechanisms. The first motor-generator MG1 is coupled to the power split mechanism 23. The first motor-generator MG1 is a three-phase AC motor-generator. The power split mechanism 23 is a planetary gear mechanism. The power split mechanism 23 is capable of splitting the driving force among the engine 21, the first motor-generator MG1, and the front wheels 14.

The first motor-generator MG1 generates electric power by receiving the driving force of the engine 21 and the driving force from the front wheels 14. The first motor-generator MG1 functions as a starter to drive the crankshaft, which is the output shaft of the engine 21, when initiating the engine 21. In this case, the first motor-generator MG1 functions as an electric motor that generates a driving force in response to supply of electric power from the battery 50. In other words, the first motor-generator MG1 functions as a drive motor.

The first motor-generator MG1 and the second motor-generator MG2 are connected to the battery 50 via the power control unit 22. AC power generated by the first motor-generator MG1 is converted into DC power by the power control unit 22. The battery 50 is charged with the DC power converted by the power control unit 22. In other words, the power control unit 22 functions as an inverter.

The DC power of the battery 50 is supplied to the power control unit 22. The DC power supplied to the power control unit 22 is converted into AC power by the power control unit 22. The AC power converted by the power control unit 22 is supplied to the second motor-generator MG2. When the plug-in hybrid electric vehicle 1 is decelerated, the second motor-generator MG2 generates electric power using the driving force from the front wheels 14. The battery 50 is charged with the generated electric power. In other words, the plug-in hybrid electric vehicle 1 performs charging through regenerative braking. In this case, the second motor-generator MG2 functions as a power generator. The AC power generated by the second motor-generator MG2 is converted into DC power by the power control unit 22. The battery 50 is charged with the DC power converted by the power control unit 22.

The rear-wheel drive motor-generator MGR is connected to the battery 50 via the power control unit 22. The rear-wheel drive motor-generator MGR is coupled to the rear wheels 15 via the rear-wheel speed reduction mechanism 56. The DC power of the battery 50 is converted into AC power by the power control unit 22, and supplied to the rear-wheel drive motor-generator MGR. The rear-wheel drive motor-generator MGR is an electric motor that drives the rear wheels 15 by using electric power supplied from the battery

50. In other words, the rear-wheel drive motor-generator MGR functions as a drive motor.

When the plug-in hybrid electric vehicle 1 is decelerated, the rear-wheel drive motor-generator MGR generates electric power using the driving force from the rear wheels 15. The battery 50 is charged with the generated electric power. In this case, the rear-wheel drive motor-generator MGR functions as a generator. AC power generated by the rear-wheel drive motor-generator MGR is converted into DC power by the power control unit 22, and the battery 50 is charged with the DC power.

Electric System of the Plug-In Hybrid Electric Vehicle 1

As shown in FIG. 7, the plug-in hybrid electric vehicle 1 includes the vehicle on-board charger 40, the junction box 41, and the DC/DC converter 42 as the high-voltage components HVC. The plug-in hybrid electric vehicle 1 includes the first charging port 18 and the second charging port 19 as charging ports into which charging plugs are inserted from the outside of the vehicle 1. The first charging port 18 is used for standard charging, which is performed using an AC power supply such as 100 V or 200 V. The second charging port 19 is used for fast charging with a high-voltage DC power supply, such as 50 kW. As shown in FIG. 1, the first charging port 18 and the second charging port 19 are disposed forward of the front door 2 and on a side surface of the vehicle 1.

As shown in FIG. 7, the vehicle on-board charger 40 is connected to the battery 50 via a wire harness. The junction box 41 is connected to the battery 50 via a wire harness. Further, the DC/DC converter 42 is connected to the junction box 41 via a wire harness.

The vehicle on-board charger 40 is connected to the first charging port 18 via a wire harness. The vehicle on-board charger 40 charges the battery 50 by converting AC power input from an AC power supply connected to the first charging port 18 into DC power and outputting the DC power. That is, the plug-in hybrid electric vehicle 1 can use an AC power supply as an external electrical power supply for charging the battery 50.

The junction box 41 has a function of distributing electric power from the battery 50 to multiple devices. The junction box 41 supplies DC power from the battery 50 to the DC/DC converter 42, an air conditioner 57, and a water heater 58.

The air conditioner 57 performs air conditioning of the passenger compartment 16 using the electric power supplied from the battery 50. The water heater 58 heats water into hot water using the electric power supplied from the battery 50. The air conditioner 57 uses the hot water as a heat source.

The junction box 41 is connected to the second charging port 19 via a wire harness. A DC power supply is connected to the second charging port 19. The DC power input from the DC power supply connected to the second charging port 19 is supplied to the battery 50 via the junction box 41. That is, the plug-in hybrid electric vehicle 1 can use a DC power supply as an external electrical power supply for charging the battery 50.

The DC/DC converter 42 is a device that decreases the voltage of the battery 50 and supplies the decreased voltage to multiple auxiliary devices. The auxiliary devices include an electric power steering system 59 and an electric oil pump 60 disposed in the engine compartment 20. The electric power steering system 59 is a mechanism that assists a steering operation of the driver. The electric oil pump 60 is a mechanism that draws lubricating oil and uses the lubricating oil to lubricate the engine 21.

Operation of Present Embodiment

In a case in which the exhaust pipe 54 is disposed under the floor panel 100 so as to pass above or below the battery 50, the plug-in hybrid electric vehicle 1 may not be able to achieve a low floor or a flat floor. As a result, the plug-in hybrid electric vehicle 1 would be unable to include a spacious passenger compartment. In order to prevent the exhaust pipe 54 from passing above or below the battery 50, the exhaust pipe 54 may be passed through the center of the vehicle, and the battery 50 may be divided into two and disposed on the opposite sides of the exhaust pipe 54. However, in this case, the plug-in hybrid electric vehicle 1 would be provided with multiple small batteries. If multiple small batteries were provided, wire harnesses are required to connect the batteries to each other. As a result, the weight of the vehicle and the number of components would increase.

According to the above-described configuration, the plug-in hybrid electric vehicle 1 ensures a space for installing the exhaust pipe 54 on the side of the battery 50 and below the floor panel 100. By disposing the exhaust pipe 54 on the side of the battery 50 in the vehicle width direction, a flat floor is achieved without raising the floor panel 100.

Advantages of the Present Embodiment (1) The above-described plug-in hybrid electric vehicle 1 accommodates the large battery 50 while achieving a low and flat floor to ensure a spacious passenger compartment.

(2) The muffler 53 is disposed rearward of the battery 50. The exhaust pipe 54 connects the engine 21 to the muffler 53. The battery 50 is heavier than the muffler 53.

According to the above-described configuration, since the muffler 53 is disposed rearward of the battery 50, the battery 50, which is relatively heavy, can be disposed closer to the center of the vehicle 1 in the vehicle front-rear direction. This prevents the weight distribution of the vehicle 1 from becoming biased toward the rear.

(3) The muffler 53 is disposed rearward of the battery 50. The exhaust pipe 54 connects the engine 21 to the muffler 53. The muffler 53 has a larger diameter than the exhaust pipe 54. If the muffler 53, which has a larger diameter than the exhaust pipe 54, is provided in the vicinity of the center of the vehicle 1 in the vehicle front-rear direction, the space for installing the battery 50 would be reduced as compared with a case in which the muffler 53 is disposed rearward of the battery 50. Disposing the muffler 53 rearward of the battery 50 narrows the space for disposing the exhaust pipe 54 on the side of the battery 50 in the vehicle width direction. This allows the plug-in hybrid electric vehicle 1 to mount a larger battery 50 under the floor panel 100.

(4) The sliding door 4 is disposed on each side surface of the vehicle 1. The guide rail 11 for sliding the sliding door 4 is disposed under the floor panel 100. A front end of the guide rail 11 is positioned rearward of a front wheel 14. A rear end of the guide rail 11 is positioned forward of a rear wheel 15. In the side view of the vehicle 1, the guide rail 11 overlaps with a part of the battery 50. The muffler 53 is located rearward of the axle of the rear wheels 15. The exhaust pipe 54 extends in the vehicle front-rear direction between the battery 50 and the guide rail 11. The muffler 53 has a larger diameter than the exhaust pipe 54. Disposing the muffler 53 rearward of the axle of the rear wheels 15 as in the above-described configuration eliminates the need to achieve a wide space for disposing the muffler 53 between the battery 50 and the guide rail 11. Therefore, even with the sliding doors 4 installed, the above-described plug-in hybrid electric vehicle 1 can accommodate a large battery 50 under the floor panel 100.

(5) Each guide rail 11 includes a curved portion 13 that extends forward so as to curve inward in the vehicle width direction. The exhaust pipe 54 is bent outward in the vehicle width direction along the curved portion 13 of the corresponding guide rail 11. Since the exhaust pipe 54 is bent and routed along the guide rail 11, a space between the exhaust pipe 54 and the guide rail 11 under the floor panel 100 is relatively narrow. As a result, a large space in which a relatively large battery 50 can be installed is ensured in the space under the floor panel 100. Therefore, the above-described plug-in hybrid electric vehicle 1 can accommodate a relatively large battery 50 under the floor panel 100.

(6) The rear-wheel drive motor-generator MGR is disposed under the floor panel 100. The muffler 53 is disposed rearward of the rear-wheel drive motor-generator MGR. The impact applied to the vehicle 1 from the rear in the vehicle front-rear direction is thus absorbed by the muffler 53 before reaching the rear-wheel drive motor-generator MGR. The plug-in hybrid electric vehicle 1 described above thus protects the rear-wheel drive motor-generator MGR from an impact applied from the rear.

(7) The fuel vapor recovery device 55 is disposed rearward of the rear-wheel drive motor-generator MGR in the vehicle front-rear direction, and to the side of the muffler 53 in the vehicle width direction. In this case, the impact applied to the vehicle 1 from the rear in the vehicle front-rear direction is thus absorbed by the muffler 53 and the fuel vapor recovery device 55 before reaching the rear-wheel drive motor-generator MGR. The plug-in hybrid electric vehicle 1 described above thus protects the rear-wheel drive motor-generator MGR from an impact applied from the rear.

(8) The fuel tank 52 is disposed rearward of the battery 50. The fuel inlet 17 is disposed on the side surface of the vehicle 1 and rearward of the sliding door 4. The fuel inlet 17 thus can be connected to the fuel tank 52 without routing the fuel supply pipe 62 around the battery 50. This allows the fuel inlet 17 to be connected to the fuel tank 52 via the fuel supply pipe 62 without reducing the volume of the battery 50. The above-described plug-in hybrid electric vehicle 1 ensures a space for installing the battery 50 while disposing the fuel tank 52 and the fuel supply pipe 62 below the floor panel 100.

Modifications

The above-described embodiment may be modified as follows. The above-described embodiments and the following modifications can be combined as long as the combined modifications remain technically consistent with each other.

The muffler 53 may be disposed at a position that is not rearward of the battery 50 as long as the muffler 53 is disposed under the floor panel 100. For example, the muffler 53 may be disposed to the side of the battery 50.

The plug-in hybrid electric vehicle 1 may be configured without the sliding doors 4, the upper rails 7, the center rails 9, and the guide rails 11.

The plug-in hybrid electric vehicle 1 may be configured with a sliding door 4, an upper rail 7, a center rail 9, and a guide rail 11 provided on only one side of the vehicle 1.

The exhaust pipe 54 does not necessarily need to be bent outward in the vehicle width direction along the curved portion 13 of the corresponding guide rail 11.

The plug-in hybrid electric vehicle 1 does not necessarily need to include the rear-wheel drive motor-generator MGR.

The muffler 53 may be disposed at a position that is not rearward of the rear-wheel drive motor-generator MGR as long as the muffler 53 is disposed under the floor panel 100. For example, the muffler 53 may be disposed forward of rear-wheel drive motor-generator MGR.

The fuel vapor recovery device 55 may be disposed at a position other than the side of the muffler 53.

The plug-in hybrid electric vehicle 1 does not necessarily need to include the fuel vapor recovery device 55.

The fuel inlet 17 may be disposed at a position other than the side surface of the vehicle 1 and rearward of the sliding door 4.

The charging lid 61 may be disposed at a position other than the side surface of the vehicle 1 and forward of the front door 2.

The plug-in hybrid electric vehicle 1 may be an autonomous vehicle. In this case, the plug-in hybrid electric vehicle 1 does not necessarily need to include the driver's seat. In this case, the plug-in hybrid electric vehicle 1 includes a right seat and a left seat as the first-row seats 30.

The plug-in hybrid electric vehicle 1 does not necessarily need to include the third-row seats 32. In this case, the plug-in hybrid electric vehicle 1 does not necessarily need to include the second slide rails 46.

The plug-in hybrid electric vehicle 1 does not necessarily need to include the first charging port 18. In other words, the plug-in hybrid electric vehicle 1 may include only the second charging port 19 as the charging port into which a charging plug is inserted.

The plug-in hybrid electric vehicle 1 does not necessarily need to include the second charging port 19. In other words, the plug-in hybrid electric vehicle 1 may include only the first charging port 18 as the charging port into which a charging plug is inserted.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A minivan-type plug-in hybrid electric vehicle in which a passenger compartment and a cargo space are not separated by a partition, the vehicle comprising:

an engine compartment provided in front of the passenger compartment in a vehicle front-rear direction;

power sources including an engine and a motor;

a fuel tank configured to store fuel to be supplied to the engine;

a battery configured to store electric power to be supplied to the motor;

a vehicle on-board charger configured to convert AC power supplied from outside of the plug-in hybrid electric vehicle into DC power and charge the battery with the DC power;

a power transmission mechanism configured to transmit rotational power of the engine and the motor to front wheels;

an inverter configured to drive the motor;

an exhaust pipe configured to guide exhaust gas from the engine rearward in the vehicle front-rear direction;

a muffler configured to reduce exhaust noise;

a first-row seat arranged on a floor panel that forms a floor surface of the passenger compartment; and a second-row seat disposed on the floor panel so as to be positioned rearward of the first-row seat in the vehicle front-rear direction, wherein the engine, the motor, the power transmission mechanism, and the inverter are disposed in the engine compartment, in the vehicle front-rear direction, the first-row seat is positioned rearward of the front wheels, and the second-row seat is positioned forward of the rear wheels, the second-row seat is configured to be slidable on the floor panel in the vehicle front-rear direction, the battery, the fuel tank, the exhaust pipe, and the muffler are disposed under the floor panel, the plug-in hybrid electric vehicle includes a right area and a left area with a center in a vehicle width direction serving as a boundary, and the battery is disposed so as to extend over both the right area and the left area such that a center of gravity of the battery is offset toward a first side in the vehicle width direction from the center in the vehicle width direction, and the exhaust pipe is disposed on a second side of the battery in the vehicle width direction, the second side being opposite to the first side.

2. The plug-in hybrid electric vehicle according to claim 1, wherein the muffler is disposed rearward of the battery in the vehicle front-rear direction, and the exhaust pipe connects the engine and the muffler to each other.

3. The plug-in hybrid electric vehicle according to claim 2, further comprising:

a first side surface provided on the first side;

a second side surface provided on the second side;

a sliding door provided on at least the second side surface of the first side surface and the second side surface; and a guide rail provided under the floor panel and slidably supporting the sliding door, wherein a front end of the guide rail is positioned rearward of the front wheels in the vehicle front-rear direction, a rear end of the guide rail is positioned forward of the rear wheels in the vehicle front-rear direction, the guide rail overlaps with a part of the battery in a side view of the vehicle, the muffler is positioned rearward of an axle of the rear wheels in the vehicle front-rear direction, and the exhaust pipe extends in the vehicle front-rear direction between the battery and the guide rail.

4. The plug-in hybrid electric vehicle according to claim 3, wherein the guide rail includes a curved portion that extends forward so as to curve inward in the vehicle width direction, and the exhaust pipe is bent outward in the vehicle width direction along the curved portion of the guide rail.

5. The plug-in hybrid electric vehicle according to claim 3, wherein the fuel tank is disposed rearward of the battery in the vehicle front-rear direction, and a fuel inlet is disposed on one of the first side surface and the second side surface so as to be positioned rearward of the sliding door in the vehicle front-rear direction.

6. The plug-in hybrid electric vehicle according to claim 1, further comprising rear-wheel drive motor-generator under the floor panel, wherein the muffler is disposed rearward of the rear-wheel drive motor-generator in the vehicle front-rear direction.

7. The plug-in hybrid electric vehicle according to claim 6, further comprising a fuel vapor recovery device that is disposed rearward of the rear-wheel drive motor-generator in the vehicle front-rear direction, and to a side of the muffler in the vehicle width direction.

* * * * *